United States Patent [19]
Johnson et al.

[11] Patent Number: 5,576,741
[45] Date of Patent: Nov. 19, 1996

[54] CONFIGURABLE CHART RECORDER

[75] Inventors: Stephen Johnson, Hingham, Mass.;
Alfred C. Mecklenburg, Salt Lake City, Utah; Daniel E. Morgan, Salem; William S. Oakland, Littleton, both of Mass.; Edward H. Yonkers, Contoocook, N.H.

[73] Assignee: General Scanning Inc., Watertown, Mass.

[21] Appl. No.: 174,150

[22] Filed: Dec. 28, 1993

[51] Int. Cl.⁶ .............................. G01D 15/00; B41J 13/10
[52] U.S. Cl. ............................................ 346/145; 400/642
[58] Field of Search ...................................... 346/145, 136; 235/4, 5, 432, 433; 400/630, 642

[56] References Cited

U.S. PATENT DOCUMENTS

| | | | |
|---|---|---|---|
| 3,838,430 | 9/1974 | Digney | 346/165 |
| 5,201,588 | 4/1993 | Sakai et al. | 400/120 |
| 5,363,129 | 11/1994 | Kline et al. | 346/136 |

*Primary Examiner*—Benjamin R. Fuller
*Assistant Examiner*—Craig A. Hallacher
*Attorney, Agent, or Firm*—Cesari and McKenna

[57] ABSTRACT

A modular-design recorder consists of a "print engine," a drive assembly for moving a print medium, e.g., paper, through the print engine, and a chassis for supporting the engine and the assembly. The chassis includes two identical sets of mounting studs, one on either side, for the mounting of the drive assembly. The drive assembly consists of a motor, a gear train through which the motor rotates the roller, and a bracket for mounting the motor on the either side of the chassis in a number of different angular orientations. The motor attaches to one end of the bracket, such that it mounts facing either toward or away from the chassis. The opposite end of the bracket mates with the mounting studs on the selected side of the chassis. The print engine consists of a print head, a roller for advancing the paper past the print head and a deflector. The deflector directs the paper in a path that is separate from and circumferential to the roller, such that the roller does not contact the paper until the paper approaches the print head. The recorder also includes a tray for storing the paper, and supplying it to the print engine. The tray includes an end wall that is removably attached to the print engine and a lid, or door, that engages a release bar included in the print engine.

13 Claims, 4 Drawing Sheets

5,576,741

CONFIGURABLE CHART RECORDER

FIELD OF THE INVENTION

This invention relates generally to strip chart recorders, and more particularly to recorders which are readily configurable to mate with systems providing data to the recorders.

BACKGROUND OF THE INVENTION

Strip chart recorders are used to record various time varying signals. For example, a strip chart recorder may be used to record atmospheric temperature, or it may be used with medical monitoring devices to record physiological data, such as the results of an electrocardiagram.

It is desirable that a strip chart recorder be capable of inclusion in any of various data acquisition systems which may have different physical configurations. The system may, for example, require that the recorder be accessible at the top of the system cabinet or at any given location on the front face, with the printed medium, referred to herein as "paper," routed in one of a number of directions. If recorders are designed specifically for these different configurations, they are essentially customized recorders. They are thus expensive to design and also to manufacture, since they each require special tooling. The user is faced with the choice of purchasing expensive, customized recorders or attempting to incorporate into a system a "standard" recorder which is not designed to mate physically with the system.

SUMMARY

A recorder embodying the invention has a modular-design configuration consisting of a "print engine" and a drive assembly for moving the paper through the print engine. The drive assembly attaches to either side of the print engine in a number of different orientations, such that the recorder can be readily configured to meet a user's space requirements. The print engine and drive assembly, and their respective components, are largely molded plastic parts that snap-fit together such that they can be assembled easily and quickly in the desired configuration.

The recorder also includes a tray for storing the print medium, referred to herein as "paper," and supplying it to the print engine. The paper tray, which is manufactured in molded plastic, includes an end wall which is readily removably attached to the print engine and a lid, or door, which engages a release bar included in the print engine. The tray has a very simple design and thus may be readily customized without excessive cost, to meet the space requirements of the user's system.

The print engine consists of a print head, a paper roller for advancing the paper past the print head and a novel paper deflector, which prevents the paper from wrinkling, during loading and thereafter during operation of the printer, by maintaining the paper in position so that it properly tracks the movement of the roller. Each of these components snap-fits into a molded plastic chassis, which includes two identical sets of mounting studs, one on either side, for the mounting of the drive assembly. These studs may also be used in mounting the recorder in the user's system.

The drive assembly consists of a motor, a gear train through which the motor rotates the paper roller, and a bracket for mounting the motor on the chassis. The motor attaches to one end of the bracket, such that it mounts facing either toward or away from the chassis. The opposite end of the bracket mates with the mounting studs on the selected side of the chassis, in one of a number of different angular orientations. An integral system of gears that mounts to the same side of the chassis as the motor includes a set of idler gears, which consists of a first, or outer, gear, that meshes with a pinion gear on the appropriate end of the paper roller, and a second, or inner, gear that engages a toothed belt driven by the motor.

The drive assembly is attached to the print engine by (i) slideably mounting onto one side of the chassis the system of gears and the bracket, with the bracket oriented to meet the user's space requirements and the motor properly attached thereto, and (ii) running the toothed belt between a cogged gear on the motor and the inner gear of the gear system. The paper tray is attached to the recorder by fitting the end wall to the recorder engine chassis and securing the two together.

The recorder may thus be assembled in a number of different configurations, without requiring, for each configuration, customized components. The only components which may require customization are the paper tray and/or the door which attaches to the tray. The tray and door are relatively easy to tool and manufacture, and thus, varying their configurations does not add considerably to the cost of the recorder.

DESCRIPTION OF THE DRAWINGS

The above and further advantages of the invention may be better understood by referring to the following description in conjunction with the accompanying drawings, in which.

DETAILED DESCRIPTION

Figure 1:
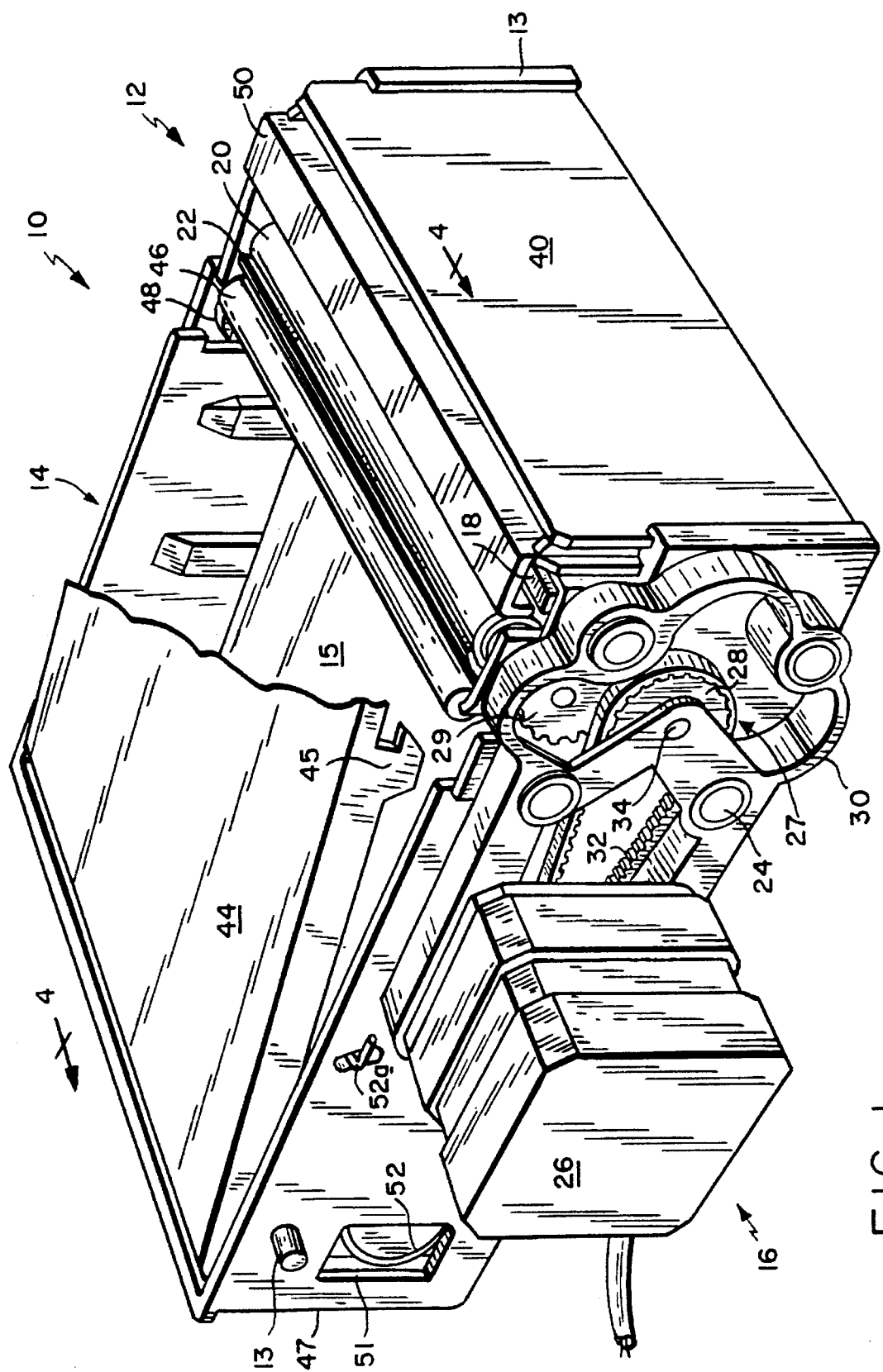
FIG. 1 is an isometric view of a recorder constructed in accordance with the current invention.

FIG. 1 depicts a recorder 10 which includes a print engine 12, which prints time varying information on paper supplied to it from a paper tray 14. A drive assembly 16 rotates a paper roller 20 in the print engine to move the paper past a print head 18 during printing operations. The print head 18 includes multiple print elements which are individually controlled by a system controller (not shown). The system controller also operates the drive assembly 16.

Figure 6:
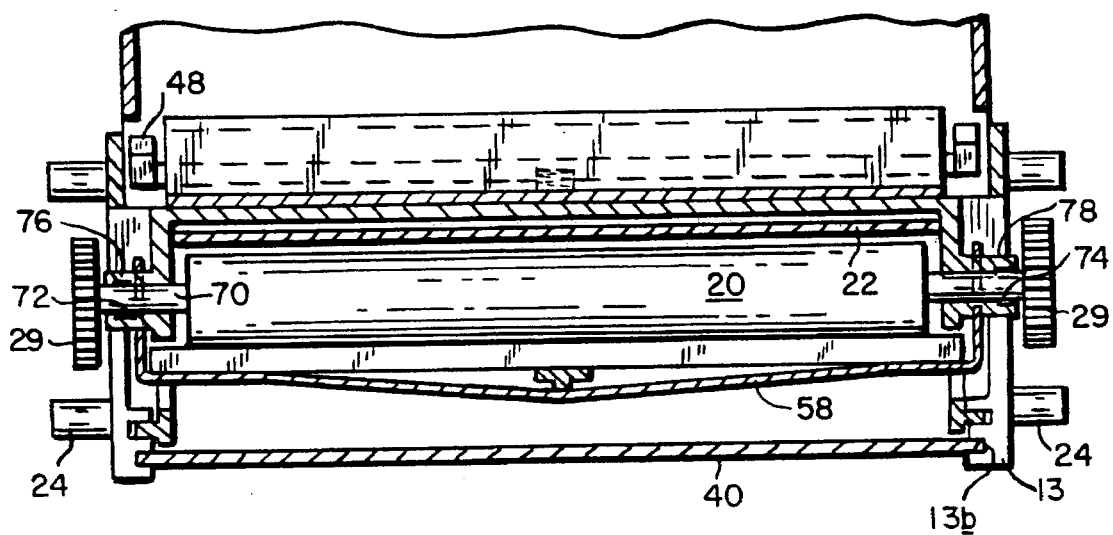
FIG. 6 is a cross-section of the recorder along line 5—5 of FIG. 4.

The print engine 12 includes a chassis 13 (shown also in FIGS. 3, 4 and 6) which supports the print head 18, the paper roller 20 and a paper deflector 22. The paper deflector 22 is discussed in more detail with reference to FIG. 4 below. The chassis 13 also supports the drive assembly 16, which mounts onto a set of studs 24 and a spindle 34 on either side of the chassis 13. This drawing illustrates only one set of the studs 24 and spindle 34. An identical set extends from the opposite side of the chassis 13, as depicted in FIG. 6.

Referring still to FIG. 1, the drive assembly 16 includes a motor 26, a gear train 27 through which the motor rotates the paper roller 20 and a bracket 30 which, as discussed in more detail with reference to FIG. 2 below, snap mounts the motor onto either side of the chassis 13 in one of a number of possible orientations. The motor 26 drives a toothed belt 32 which rotates a gear system 28, which, in turn, meshes with and rotates a pinion gear 29 attached to the paper roller 20. The gear system 28, which includes an outer idler gear 28a and an inner idler gear (not shown), slideably mounts onto the spindle 34 on the side of the chassis to which the motor is to be mounted.

Figure 3:
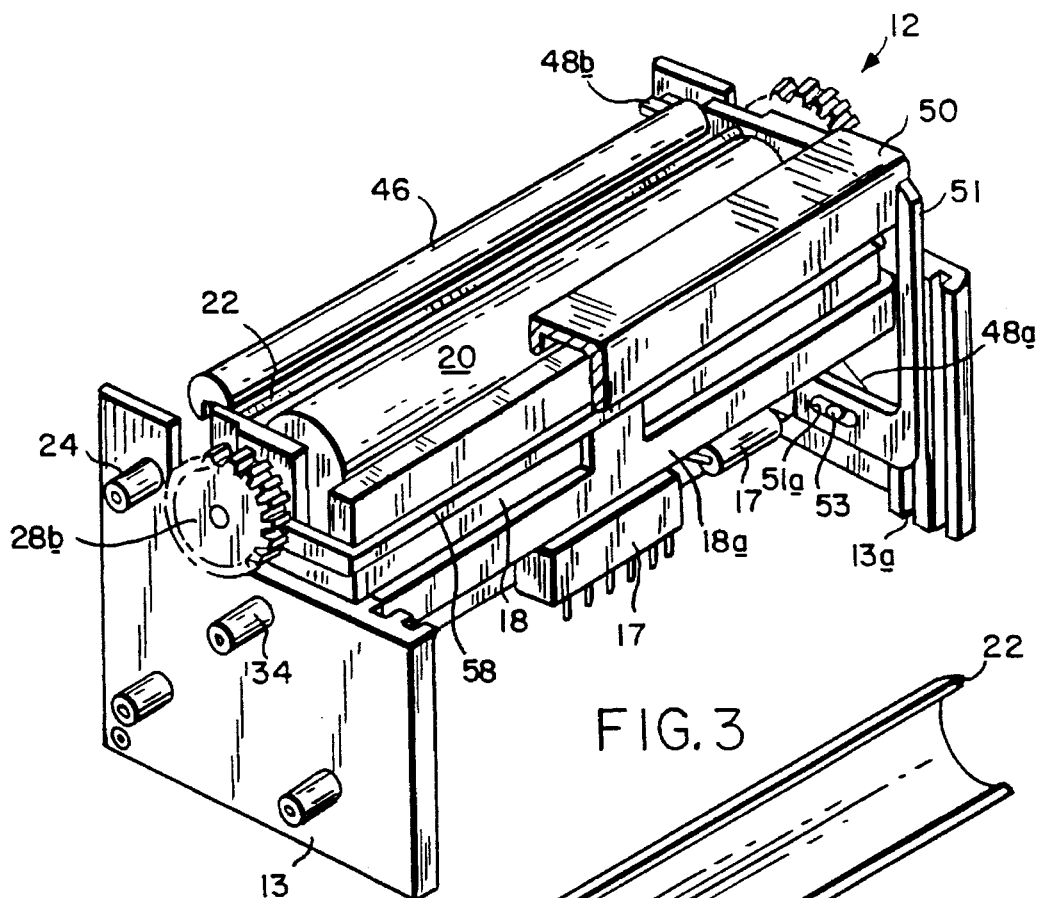
FIG. 3 is an illustration of the print engine depicted in FIG. 1.
Figure 4:
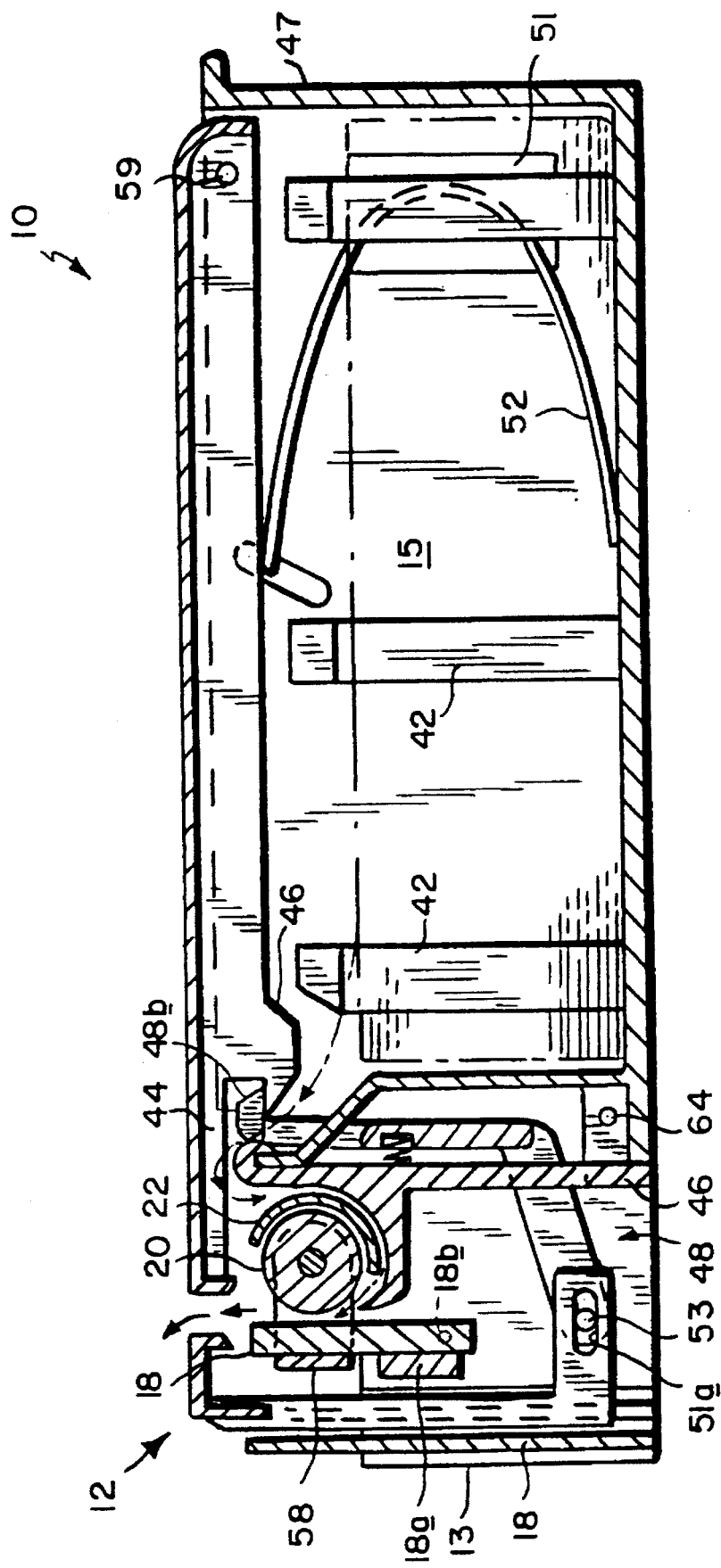
FIG. 4 is a cross-section of the recorder along line 4—4 of FIG. 1.

The paper tray 14 attaches to the print engine chassis 13 by fitting a top edge of an end wall 42 (FIG. 4) under a lip of a chassis end wall 46 and securing the two end walls together by inserting screws through aligned screw holes 64 (FIG. 4). Tray side and bottom walls 47 which connect to the end wall 42 form a storage bin for the paper 15. The tray also includes a spring-loaded door 44, which has catches 45 that engage latches 48 (depicted in more detail in FIGS. 3 and 4) which are supported by the chassis 13 and controlled from the front of the print engine by means of a release bar 50. A spring 52, which is depicted in more detail in FIG. 4, compresses when the door 44 is closed and remains compressed as long as the catches 45 engage latches 48. When the catches 45 are released, the spring 52 extends and forces the door open.

The tray 14 is preferably constructed of molded plastic, such that the side walls, the bottom wall and the door may be manufactured inexpensively in various sizes and configurations. Accordingly, the tray may be readily customized to meet the space requirements of the user's system, as long as the end wall 42 is appropriately configured to mate with the print engine and the door includes catches which engage the latches 48.

The tray 14 also includes a mounting stud 13 extending outwardly from side wall 47 and a lip 15 extending outwardly from the tops of the side walls 47, either or both of which may be used in mounting the tray onto the data providing system.

Figure 2:
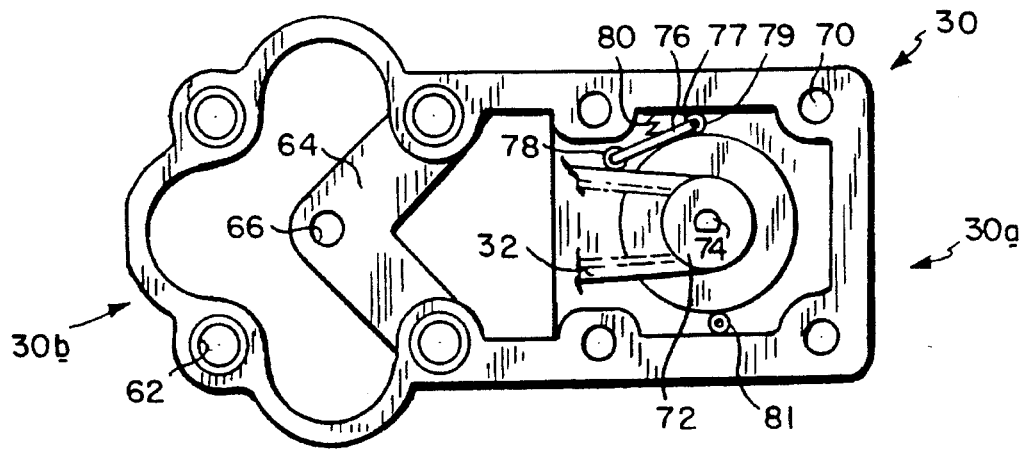
FIG. 2 is an illustration of the mounting bracket depicted in FIG. 1.

The bracket 30 is depicted in more detail in FIG. 2. The bracket 30 is shaped to mount the motor 26, which attaches to one end 30a of the bracket, onto the chassis 13 in four different angular orientations, without interfering with the operations of the motor 26 and the system of gears 27 (FIG. 1).

The end 30b of the bracket which mounts onto the chassis includes shaped mounting holes 62, discussed in more detail with reference to FIG. 7 below, and an inwardly pointing V-shaped stiffener 64, with a hole 66 at the apex of the V. When the bracket 30 is mounted onto the chassis 13, three of the four holes 62 slide onto the studs 24 (FIGS. 1 and 3) to position the bracket and hold it in place. The hole 66 aligns with and fits onto the end of the spindle 34, to retain the gears thereon. In three angular orientations, one of three outwardly bowed sides 68 fits around the pinion gear 29, allowing the gear to rotate freely. In a fourth orientation, the wide-end of the V-shaped stiffener fits around the pinion gear. With this configuration, the bracket may be used to mount the motor to the left, the right or directly above or below the spindle 34.

The opposite end 30a of the bracket conforms to the shape of the motor 26, which in this embodiment is rectangular. This end is thus rectangular with screw holes 70 at the periphery that accommodate screws 71 securing the motor 26 to the bracket. The motor attaches to either side of the bracket such that, in a number of the angular orientations, the motor may be mounted facing toward or away from the print engine. Accordingly, the motor is preferably one which can operate in either of two directions, as appropriate, to drive the belt 32. For example, the motor may be a stepper motor. The end 30a of the bracket is generally open to accommodate the belt, which runs between a cogged gear 72 on the motor and the gear system 28 mounted on the chassis 13 (FIG. 1).

The bracket 30 also supports an idler arm 76, which operates with a spring 80 to maintain the tension of the belt 32. The idler arm 76 attaches to the bracket 30 at one end 77. At an opposite end, the arm supports an idler wheel 78 which contacts the belt 32, on the side which rotates toward the mounted gear system 27 (FIG. 1). The spring 80 holds the wheel 78 in contact with the belt 32, and provides a predetermined pressure on the arm, to maintain the belt at a predetermined tension. The arm and spring may be mounted on either side of the bracket, using mounts 79 and 81, respectively. They are mounted on the side of the bracket which allows the idler wheel 78 to contact the appropriate side of the belt. Accordingly, they may be used with motors which operate in either direction, as discussed above with reference to FIG. 2.

FIG. 3 depicts the print engine 12 detached from the box 14. Panel 40 has been removed to reveal a print head holder 18a, which supports the print head 18, a spring 58, which holds the print head 18 in position relative to the paper roller 20, and circuitry referred to generally as 17 which connects the print head 18, through a printed circuit board (not shown) to the system controller. As discussed in more detail with reference to FIG. 4 below, the print head holder 18a and the spring 58 snap fit into the chassis 13 for easy assembly.

The release bar 50 also snap fits to the chassis 13. Arms 51 which extend from the bar slide along guiding slots 13a and slots 51a in the arms slip over pins 53, which are on the ends 48a of latches 48. The opposite ends 48b of the latches engage the catches 45 of paper tray door 44 (FIG. 1). When the release bar 50 is pushed downward, arms 51 pull downward on the pins 53, which cause the latches 48 to pivot and the ends 48b to rotate toward the front of the chassis 13.

The latches 48, which are depicted in more detail in FIG. 4, are connected together across the rear of the chassis 13. A leaf spring 49 is incorporated into the latches to provide resistance, which must be overcome to release the lid. Accordingly, a light bump of the bar 50 will not cause the lid to release accidentally.

Figure 5:
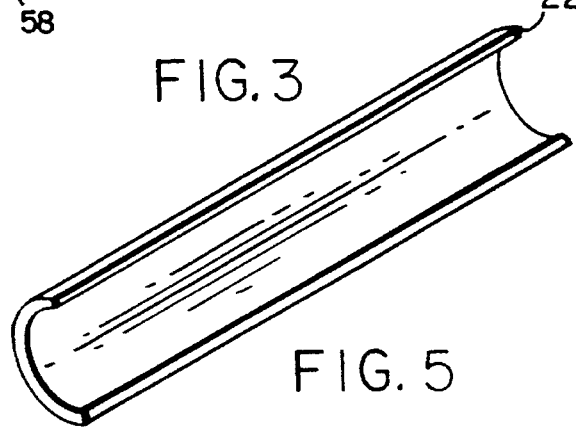
FIG. 5 is an isometric view of a paper deflector depicted in FIGS. 1 and 3.

Referring now to FIGS. 4 and 5, the path of the paper 15 from the paper tray 14 through the print engine 12 is depicted by arrows. To load the paper 15 into the print engine 12, a user hand feeds the paper past the paper deflector 22, which keeps the paper separated from the paper roller 20, and at the same time on track with the movements of the roller. When the paper approaches the end of the paper guide, it is directed toward the print head 18 by an extension of chassis end wall 46. A photosensor (not shown) located near the end of the paper guide senses the edge of the paper and sends a signal to the system controller, which directs the rotation of the paper roller 20 to advance the paper into proper printing position.

The paper deflector 22, which has a semi-circular cross-section, extends the length of the paper roller. The deflector 22 essentially directs the paper in a path around the roller, such that the roller does not contact the paper until the paper approaches the printhead. At this point in the path, the paper properly tracks the movement of the roller. Accordingly, the paper roller advances the paper to the print head such that the paper is pulled evenly and in parallel with the long axis of the roller. The paper deflector 22 thus prevents the jamming of the paper, by preventing the paper from approaching the roller askew, where it would be pulled even further off-center by the roller and rub against or get caught on the sides of the chassis 13.

The paper, after printing, escapes through an opening between the end of door 44 and an opposing end of the release bar 50. One edge of each of these ends is sharpened, such that the printed paper can be cut from the paper supply, regardless of which direction the paper is routed.

As discussed above, the recorder is quickly and easily assembled, with components snap fitting together. For example, the print head 18 and print head holder 18a snap-fit to the chassis 13 by inserting tabs 18b on either side of the holder into appropriately sized holes in the side walls of the chassis 13. Similarly, the drive assembly 16 (FIG. 1) mounts to the chassis 13 by fitting the various gears and the bracket onto the appropriate studs and spindle on the selected side.

The tray 14 is easy to assemble, also. An assembler aligns holes 59 in the door with holes in the side walls of the tray and inserts a shaft. The assembler installs the spring 52 by fitting one end of the spring into a hole in the bottom wall of the tray and directing the other end through an opening in the side wall of the tray. As necessary, the assembler may grip the spring through an opening 51 in the side wall during installation.

Referring now to FIG. 6, identical sets of studs 24 on either side of the chassis 13 are shown. Panel 40 is included in this view and is installed on the chassis 13 by sliding it into slots 13b. Tabs (not shown) in the slots 13b retain the panel in place.

The paper roller 20 is supported by an axle 70, which rotates within bearings 72 and 74 attached to the pinion gears 29 on either side of the axle 70. The bearings 72 and 74, respectively, rotate within journals 76 and 78. The journals are C-shaped so that the ends of the axle 70 slide into them easily, through the openings. When the pinion gears 29 with bearings 72 and 72 are attached to the ends of the axle 70, the ends no longer fit through the openings in the C-shaped journals, and the axle is thus held in place.

Figure 7:
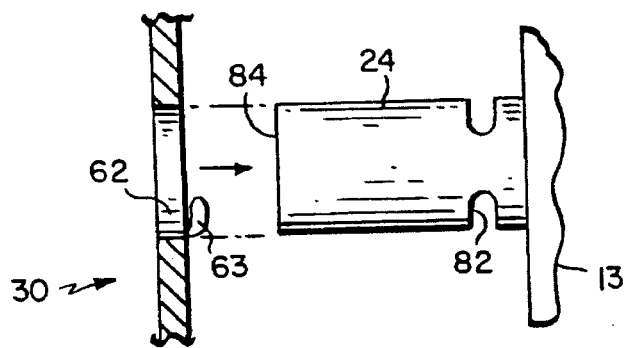
FIG. 7 is an illustration a mechanism for attaching the mounting bracket to the print engine of FIG. 1.

FIG. 7 depicts the studs 24 (FIGS. 1 and 3) and the bracket mounting holes 62 (FIGS. 1 and 2) in more detail. The studs 24 are hollowed, cylindrical projections with indents 82 near the end which attaches to the chassis 13. The mounting hole 62 includes one or more tabs 63, which mate with the indents 82 when the bracket is mounted on the chassis. To mount the bracket 30, the assembler aligns the holes 62 of the bracket with the studs, and slides the bracket down onto the studs. The tabs 63 slide along the studs 24, until they reach the indents 82. The tabs 63 then essentially spring into the indents 82, and lock the bracket in place. Self-tapping screws may be inserted into the apertures 84 in the studs, as necessary, to mount the recorder onto the user's system. Alternatively, screws can be used to secure the bracket 30 to the chassis 13.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

We claim:

1. A recorder comprising:
   A. a print engine including:
      i. a chassis with a pair of opposed sides and a plurality of studs extending outwardly from each of said opposed sides;
      ii. a print head mounted in said chassis and extending between said sides; and
      iii. a roller for advancing a print medium past the print head, the roller being mounted in said chassis and extending between said sides;
   B. a motor for driving the roller; and
   C. a bracket for mounting the motor on the chassis, the bracket including mounting holes which align in any of a plurality of angular orientations with one or more of the studs, whereby the bracket may mount the motor on either side of the chassis in a selected angular orientation.

2. The recorder of claim 1, further including:
   D. a system of gears through which the motor drives the roller, the system comprising:
      i. a pinion gear attached to the roller; and
      ii. a set of idler gears including a second gear which meshes with the pinion gear and is driven by the motor; and
   E. a drive belt extending between said motor and said set of idler gears for rotating said second gear.

3. The recorder of claim 2, wherein the chassis includes, on each of said sides, an outwardly extending spindle for supporting the set of idler gears.

4. The recorder of claim 3, wherein the bracket includes a first end and a second end, the first end attaching to the motor and the second end attaching to the chassis, the second end including:
   i. first and second opposed sides;
   ii. an inner V-shaped stiffener extending inwardly from said opposed sides and including at its apex a hole which aligns with the spindle; and
   iii. a plurality of peripheral mounting holes through said sides and positioned such that the mounting holes align with studs in a plurality of angular orientations of said bracket.

5. The recorder of claim 4, wherein the bracket further includes an idler arm and a spring which mount on either of the opposed sides, the idler arm connecting to the drive belt and the spring connecting to the idler arm to maintain a desired tension on the drive belt.

6. The recorder of claim 1, wherein:
   A. the chassis further includes
      i. a chassis end wall;
      ii. pivoting latches mounted on said sides;
      iii. a release bar connected to one end of each of said latches; and
   B. said recorder further includes a paper storage box, said box including:
      i. a box end wall which mates with said chassis end wall;
      ii. a lid with catches which engage said pivoting latches, said lid remaining closed when engaging said catches and opening when said catches disengage from said latches;
   said release bar pivoting said latches when a sufficient force is applied thereto, to disengage said latches from said catches.

7. A print engine for a recorder, the engine including:
   A. a print head;

B. a roller for advancing a print medium past said print head, the roller having a length;

C. a deflector proximate to said roller, said deflector directing the print medium on a path separate from and circumferential to said roller until the print medium approaches said print head; and D. a chassis including opposing sides, said chassis supporting said print head, roller and deflector between said opposing sides.

8. The print engine of claim 7, wherein the deflector has a semi-circular cross-section and extends the length of the roller.

9. A strip chart recorder including:

A. a print head;

B. a roller for advancing a print medium past said print head;

C. a motor for driving said roller;

D. a tray for housing the print medium, said tray including an end wall and a door with catches; and E. a chassis, including a pair of opposing sides, a front and a chassis end wall opposite the front, for
  i. supporting between said sides said print head and roller,
  ii. mounting said motor on either side of said chassis on studs extending outwardly from each of said sides,
  iii. holding said tray in proximity to said roller, said chassis end wall including a lip which extends across a top edge of said wall, said lip engaging a top edge of said end wall and a bottom edge of said chassis end wall mating with a bottom edge of said box end wall for securing said box end wall to said chassis end wall,
  iv. supporting one or more pivoting latches mounted on one or more of said sides, said latches each including a first end which engages one of said catches on said door to retain said door in a closed position, and
  v. a release means for controlling said latches, said release means being in engagement with said latches and accessible from the front of said chassis and, when sufficient force is applied to said release means, said means pivots the latches out of engagement with the catches, wherein said door is released from the closed position.

10. The strip chart recorder of claim 9, wherein the recorder further includes a deflector proximate to said roller, said guide directing the print medium on a path separate from and circumferential to said roller until the print medium approaches said print head.

11. The strip chart recorder of claim 9, wherein the recorder further includes a bracket for mounting the motor on the chassis in a selected angular orientation.

12. A strip chart recorder including:

A. a print head;

B. a roller for advancing a print medium past said print head;

C. a motor for driving said roller;

D. a chassis for supporting the roller and the motor, said chassis including a front and a chassis end wall that is opposite the front;

E. a tray for housing the print medium, said tray being supported by said chassis end wall and including a tray end wall, that engages said chassis end wall, and a door with catches, said catches being located proximate to said end wall; and F. one or more pivoting latches mounted on said chassis proximate to said chassis end wall, said latches each including a first end which engages one of said catches on said door to retain said door in a closed position, and G. a release means for controlling said latches, said release means being in engagement with said latches and accessible from the front of said chassis, and when sufficient force is applied to said release means, said means pivots the latches out of engagement with the catches, wherein said door is released from the closed position.

13. The strip chart recorder of claim 12, wherein said release means includes a bar which is activated by applying to any portion of the bar a downward force.

* * * * *